United States Patent
Wu et al.

(10) Patent No.: US 10,857,065 B2
(45) Date of Patent: Dec. 8, 2020

(54) VEHICLE SEAT

(71) Applicant: Faurecia (China) Holding Co., Ltd., Shanghai (CN)

(72) Inventors: Zhenlin Wu, Shanghai (CN); Qichen He, Shanghai (CN)

(73) Assignee: FAURECIA (CHINA) HOLDING CO., LTD, Shanghai (CN)

( * ) Notice: Subject to any disclaimer, the term of this patent is extended or adjusted under 35 U.S.C. 154(b) by 462 days.

(21) Appl. No.: 14/415,360

(22) PCT Filed: Jul. 4, 2013

(86) PCT No.: PCT/CN2013/078816
§ 371 (c)(1),
(2) Date: Jan. 16, 2015

(87) PCT Pub. No.: WO2014/012439
PCT Pub. Date: Jan. 23, 2014

(65) Prior Publication Data
US 2015/0191109 A1    Jul. 9, 2015

(30) Foreign Application Priority Data
Jul. 17, 2012    (CN) .................... 2012 2 0345656 U

(51) Int. Cl.
*A61H 23/04*    (2006.01)
*B60N 3/06*    (2006.01)
(Continued)

(52) U.S. Cl.
CPC ............. *A61H 23/04* (2013.01); *A61H 15/00* (2013.01); *B60N 2/976* (2018.02); *B60N 2/995* (2018.02);
(Continued)

(58) Field of Classification Search
CPC .................. B60N 2/448; B60N 2/4495; B60N 3/06–066; A61H 7/00–002;
(Continued)

(56) References Cited

U.S. PATENT DOCUMENTS 5,312,155 A    5/1994    Akima et al.
6,010,468 A *  1/2000    Grove .................. A61H 1/0266
                                                                    601/23
(Continued)

FOREIGN PATENT DOCUMENTS

CN    201922971 U    8/2011
CN    202782757 U    3/2013
(Continued)

OTHER PUBLICATIONS

International Search Report for PCT/CN2013/078816 dated Oct. 17, 2013, 5 pages.
(Continued)

*Primary Examiner* — Rachel T Sippel
(74) *Attorney, Agent, or Firm* — Reising Ethington P.C.

(57) ABSTRACT

A vehicle seat includes a seat back having a foot massage system. The seat back includes a front side and rear side, the rear side receiving the foot massage system. The foot massage system is configured to pivot around an axis that is fixed relative to the seat back between a first in-use position, wherein the massage system pivots down to receive a passenger's feet, and a second folded-away position wherein the massage system is retracted along the backrest rear side. The foot massage system includes a registration area for guiding the passenger's foot to proper massage position and can be equipped with a pressure detection system having pressure sensors that, when pressed, allow the foot massage system to work.

14 Claims, 4 Drawing Sheets

(51) Int. Cl.
*A61H 15/00* (2006.01)
*B60N 2/90* (2018.01)
*A61H 23/02* (2006.01)

(52) U.S. Cl.
CPC .............. *B60N 3/06* (2013.01); *B60N 3/063* (2013.01); *A61H 23/02* (2013.01); *A61H 2201/0149* (2013.01); *A61H 2201/0161* (2013.01); *A61H 2201/0176* (2013.01); *A61H 2201/1238* (2013.01); *A61H 2201/164* (2013.01); *A61H 2201/5071* (2013.01); *A61H 2201/5082* (2013.01); *A61H 2205/12* (2013.01)

(58) Field of Classification Search
CPC .......... A61H 7/004; A61H 7/007; A61H 9/00; A61H 9/005; A61H 9/0078–0092; A61H 15/00–0078; A61H 35/006; A61H 23/02; A61H 23/04; A61H 2201/0103; A61H 2201/0149; A61H 2201/0161; A61H 2201/1238; A61H 2201/164; A61H 2201/1676; A61H 2201/5056; A61H 2201/5061; A61H 2203/0425–0431; A61H 2205/12–1
See application file for complete search history.

(56) References Cited

U.S. PATENT DOCUMENTS

| | | | | |
|---|---|---|---|---|
| 6,375,266 B1* | 4/2002 | Ferguson | ............... | B60N 3/063 297/423.15 |
| 7,509,755 B2* | 3/2009 | Avanzini | ................ | A47K 10/48 34/232 |
| 7,988,649 B1* | 8/2011 | Kost | ...................... | A61H 23/02 601/15 |
| 2005/0288612 A1* | 12/2005 | Suzuki | ................. | A61H 1/0266 601/151 |
| 2006/0247564 A1* | 11/2006 | Ravikumar | ............ | A61H 7/001 601/152 |
| 2007/0232969 A1* | 10/2007 | Yu | .......................... | A61H 15/00 601/99 |
| 2008/0319430 A1* | 12/2008 | Zenzie | ................. | A61B 18/203 606/9 |
| 2009/0227912 A1* | 9/2009 | Enami | .................. | A61H 9/0078 601/49 |
| 2009/0322139 A1* | 12/2009 | Clough | .................. | B60N 3/063 297/423.15 |
| 2011/0040220 A1* | 2/2011 | Holgreen | ............. | A61H 9/0078 601/148 |
| 2013/0038107 A1* | 2/2013 | Tamura | .................. | B60N 2/067 297/331 |
| 2015/0173999 A1* | 6/2015 | Vanderstegen-Drake | ................... | A61H 9/0092 601/151 |

FOREIGN PATENT DOCUMENTS

| | | | | |
|---|---|---|---|---|
| DE | 10102007041504 A1 | | 3/2009 | |
| DE | 102012223380 A1 * | | 6/2014 | ............. B60N 2/976 |
| JP | 2008074122 A | | 4/2008 | |
| WO | WO2011135651 A1 | | 11/2011 | |

OTHER PUBLICATIONS

Written Opinion for PCT/CN2013/078816 dated Sep. 29, 2013, 4 pages.
International Preliminary Report on Patentability for PCT/CN2013/078816 dated Jan. 20, 2015, 5 pages.

* cited by examiner

VEHICLE SEAT

FIELD OF THE INVENTION

The invention relates to a vehicle seat, particularly a vehicle seat with a foot massage system.

BACKGROUND OF THE INVENTION

Nowadays, vehicle has become one of the main transportations. However, long-time travel causes passengers to suffer muscle tension or soreness, especially on his/her feet. The current vehicle seat cannot meet people's needs.

Document DE 102007041504B4, of which the title is "passenger seat for passenger car", has disclosed a footrest behind a back rest and provided with a massage system.

Whereas in the prior art including the above patent, due to the acting force of the massage units during massage, it's hard for a passenger to locate his/her feet on the proper massage position. In addition, when the foot massage device is activated, no matter the passenger's feet are on the pedal or not, the massage device will always be working, which makes the rate of energy utilization of the massage units low and impacts safety for use as well as other defects.

SUMMARY OF THE INVENTION

To this end, in order to solve the technical problems above, the present invention in at least some embodiments provides a foot massage system with foot registration and pressure detection functions for vehicle seats, which can locate the passenger's feet to the proper massage position for a proper massage, with simple structure, easy operation and facility to production.

To be specific, the invention in at least some embodiments is achieved by the following technical solutions.

A vehicle seat comprising a seat back having a foot massage system, wherein the seat back includes a front side and a rear side, the rear side comprising a cavity for receiving the foot massage system, said foot massage system configured to pivot around an axis that is fixed relative to the seat back between a first in-use position, wherein the massage system pivots down to receive a passenger's feet, and a second folded-away position wherein the massage system is retreated into the cavity.

The massage system includes a foot registration system which contains registration areas for guiding the passenger's feet to a proper massage position.

The foot registration system includes a plurality of pneumatic elements for example in the form of cells, and the registration areas can be temporal protrusions and the temporal protrusions are formed by the pneumatic elements being inflated to 30% to 70% of their full volume when the massage system is ready for use.

Alternatively, the foot registration system includes at least three pneumatic elements for each foot, and the temporal protrusion for each foot is formed by one of the pneumatic elements located in the lower center on the massage system.

Alternatively, the registration areas can be permanent protrusions. The permanent protrusions are made of thin elastic elements and may contain magnetic elements.

Preferably, the registration areas are configured to opposite to the arch of each passenger's foot for the foot in the proper massage position.

The massage system further contains a pressure detection system for sensing the stable position of the feet on the massage system ready for massage.

Preferably, the pressure detection system contains at least three pressure sensors for each foot, and when all of these pressure sensors are pressed by the foot, the foot massage system is activated for the massage.

Alternatively, the massage units of the foot massage system may be chosen from a plurality of pneumatic massage elements in the form of cells, a plurality of massage rollers and a plurality of electromagnetic massage actuators.

BRIEF DESCRIPTION OF THE DRAWING

This invention is now described using an example for illustration only that in no way limits the scope of the invention, on the basis of the following drawings, in which.

DETAILED DESCRIPTION

By referring to the figures, the present invention is further described by the description of embodiments. In the figures, the same references are used to denote identical or similar items.

Figure 1:
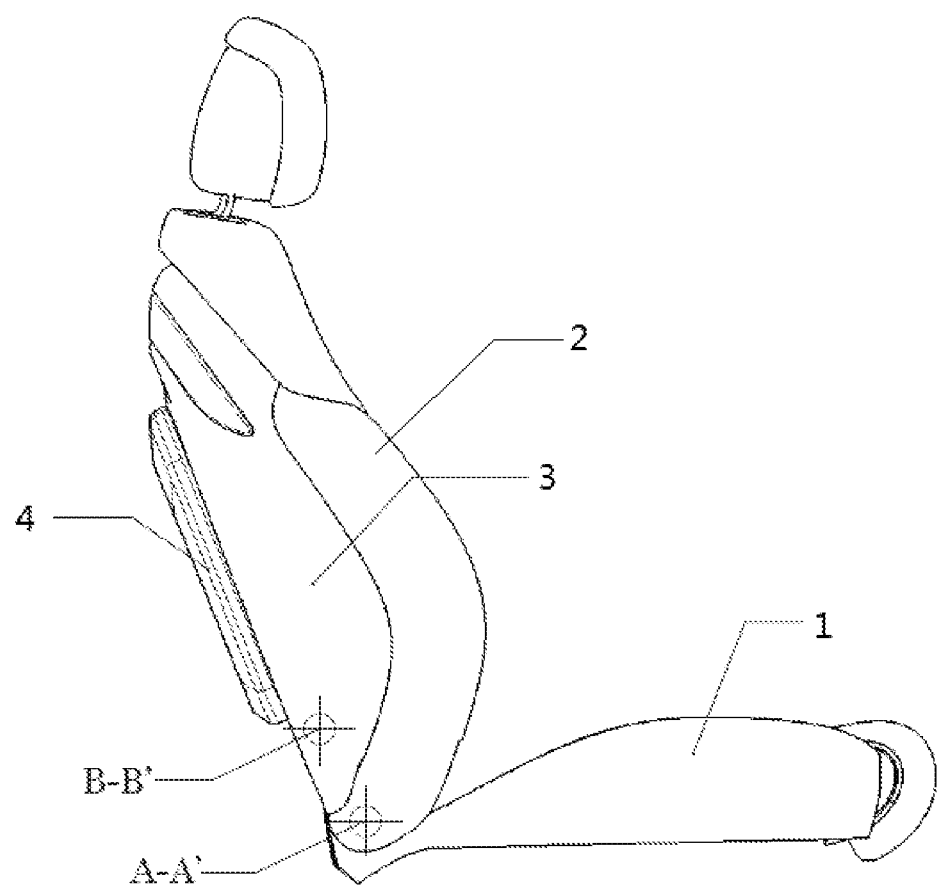
FIG. 1 is the lateral view of the seat according to the invention.
Figure 2:
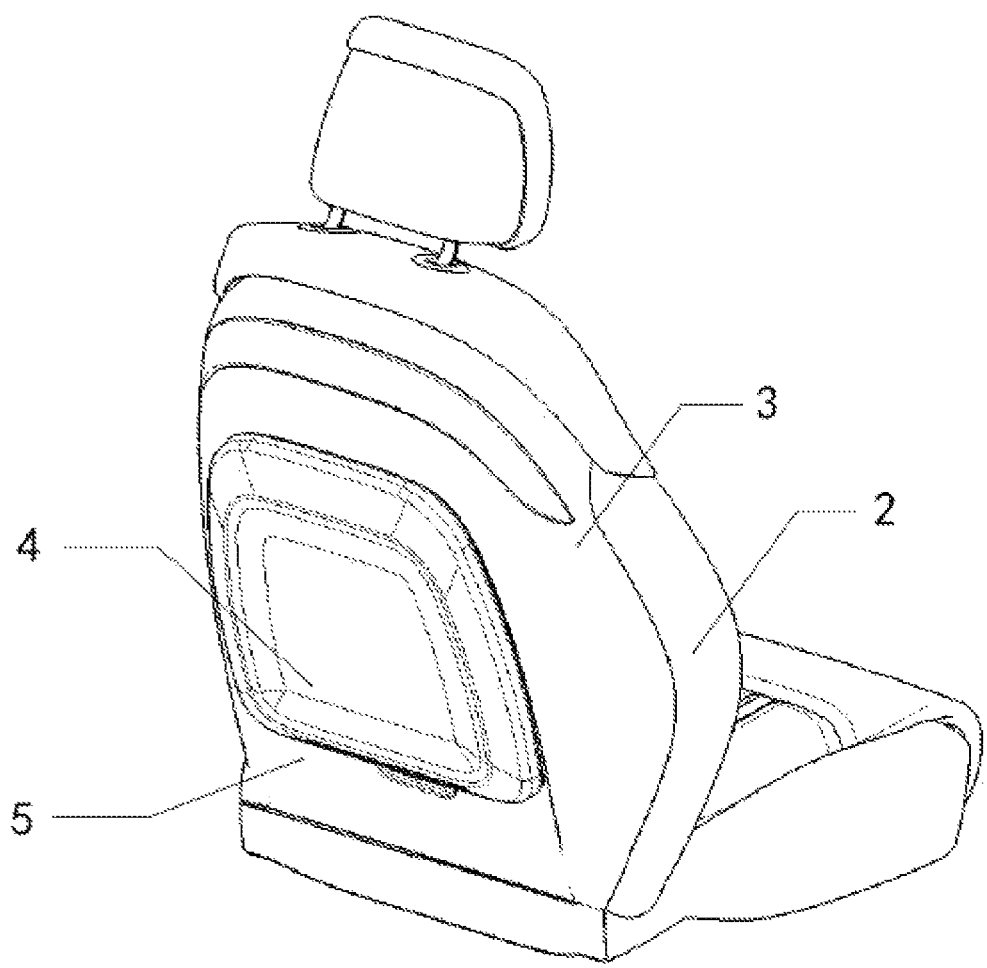
FIG. 2 is a perspective view of the seat according to the invention, wherein the foot massage system of the embodiment is in the second folded-away position.
Figure 3:
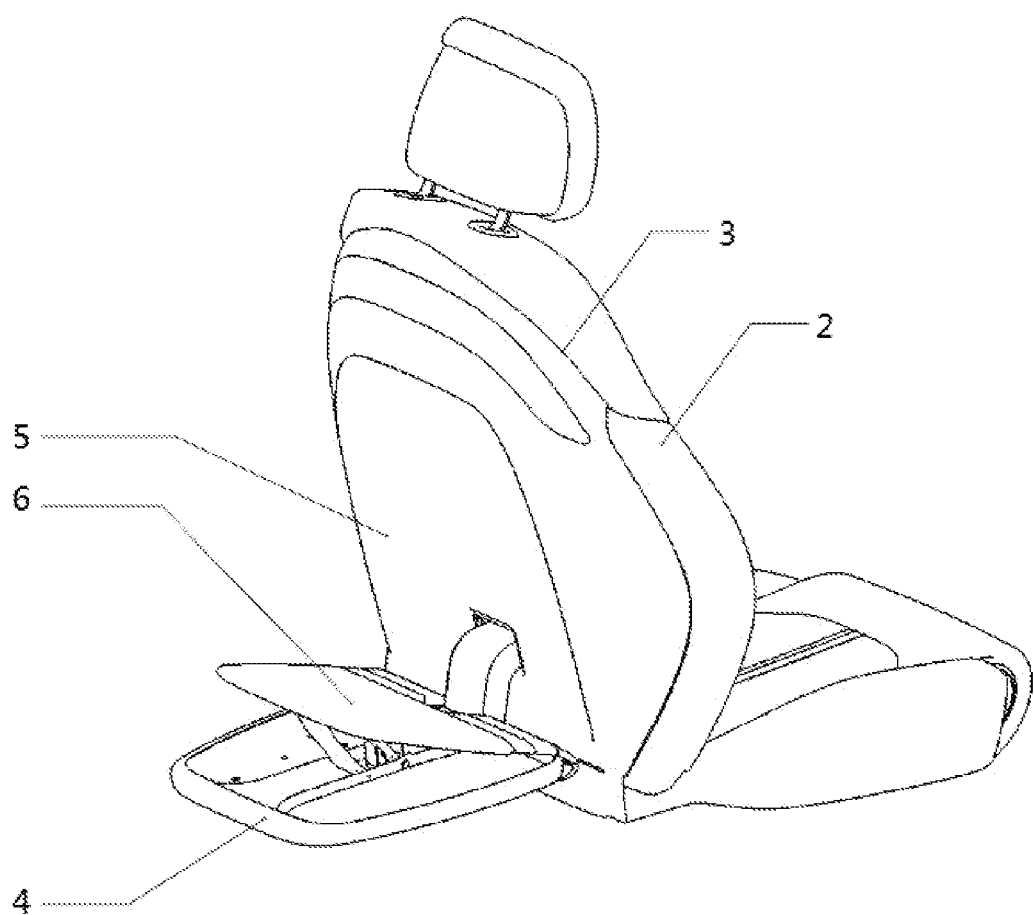
FIG. 3 is a perspective view of the seat according to the invention, wherein the foot massage system of the embodiment is in the first in-use position.

FIG. 1 shows a vehicle seat which includes a seat cushion 1 and a seat backrest comprising front side 2 and rear side 3. The seat backrest rotates around axis A-A' relative to the seat cushion 1. And the seat backrest includes a foot massage system 4 and in fixed on the chassis of a vehicle.

As shown in FIGS. 2 to 5, in an embodiment of the invention, the seat backrest includes front side 2 and rear side 3, wherein the rear side 3 includes a cavity 5 for receiving a foot massage system 4. The foot massage system 4 is hinged to the rear side 3 and is driven by a hydraulic actuator or a pneumatic device or an electric device or a similar device, so as to pivot around axis B-B' between a first in-use position in which the foot massage system 4 rotates down from the cavity 5 to receive passenger's feet and a second folded-away position in which the foot massage system 4 turns back into the cavity 5. The foot massage system 4 may includes a cover 6, at least one extensible foot receiving space 7, a pressure detection system comprising pressure sensors 8, massage units 9 such as electromagnetic massage actuators or massage rollers or pneumatic massage elements, and registration areas 10 for guiding the passenger's feet to proper massage position.

Preferably, the registration area 10 can be located at the lower center of the foot massage system 4, opposite to the arch of each passenger's foot.

Furthermore, the registration areas 10 can be temporal protrusions or permanent protrusions.

Figure 5:
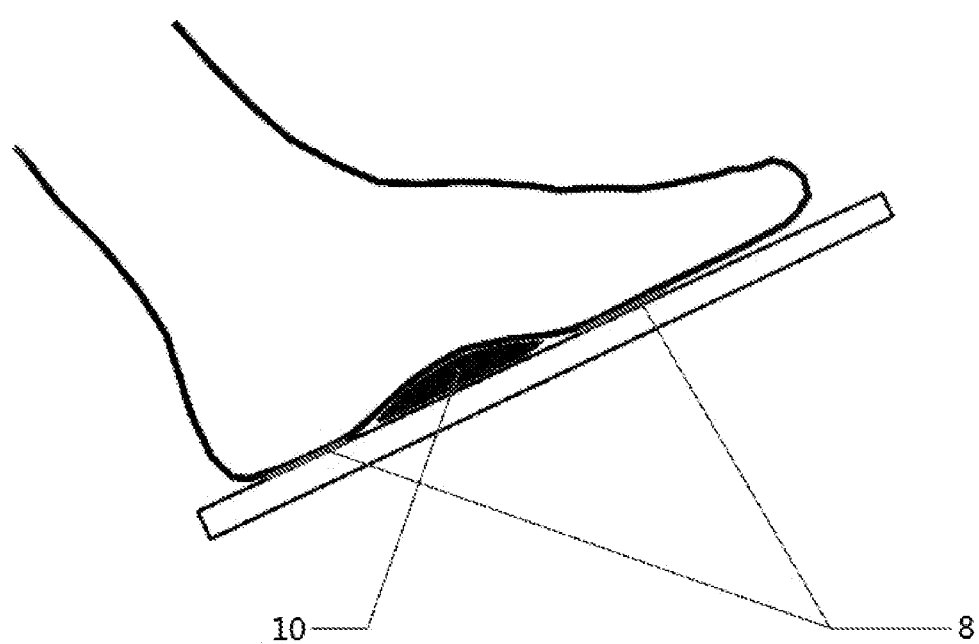
FIG. 5 is the lateral view of the foot massage system according to the invention.

When the registration areas 10 are temporal protrusions, the temporal protrusions can be formed by pneumatic elements. After the foot massage system 4 is activated, the pneumatic elements will be inflated to 30% to 70%, preferably 40% of their full volume, so as to make the temporal protrusions tightly contact with the arch of each passenger's foot, in order to guide the passenger's feet to proper massage position (as shown in FIG. 5).

Figure 4:
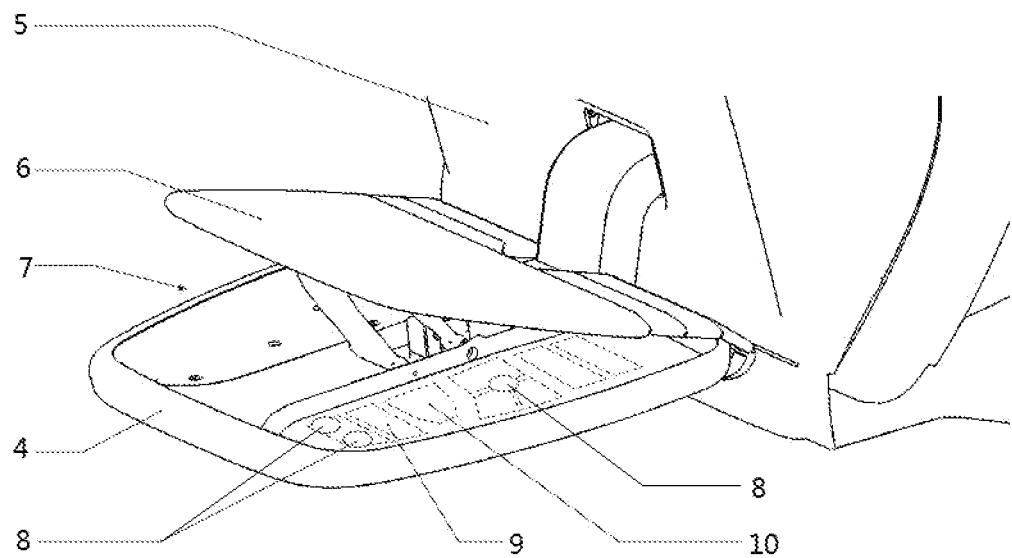
FIG. 4 is an enlarged perspective view of the foot massage system according to the invention.

In addition, the pressure detection system includes at least 3 pressure sensors 8 for each foot (as shown in FIG. 4). The pressure sensors 8 can detect pressure when the feet contact with the surface of the foot massage system 4. Only when all of the pressure sensors 8 are pressed and the pressure detected is equal to or larger than a predetermined value of pressure, the foot massage system 4 will be activated. Otherwise, if any one of the pressure sensors 8 is not pressed or the pressure detected is smaller than the predetermined value of pressure, the foot massage system 8 will not be activated.

As an example, in one embodiment, registration areas 10 are temporal protrusions, and when a passenger sits on the backseat, he can rotate down the foot massage system 4 from the cavity 5 and actuate the same by a control device such as a button. Then, the temporal protrusions will be inflated to 30% to 70%, preferably 40%, of their full volume to make itself to be the shape that can tightly contact the arch of passenger's feet. At the same time, since the passenger's feet have not been positioned on the foot massage system 4 yet, or none or the pressure sensor 8 receives pressure input, the massage units 9 are not activated. Then, after the passenger's feet are positioned on the foot massage system 4 and guided to proper massage position by the temporal protrusions, and when the pressure detected by all of the pressure sensors 8 are equal to or bigger than the predetermined value of pressure, the massage units 9 are activated and massage the passenger's feet. Preferably, if she passenger's feet uplift or move, which makes any one of the pressure detected of the pressure sensors 8 smaller than the predetermined value of pressure, the massage units 9 stop to work, so as to remind the passenger to locate the feet on proper massage position and save energy.

Alternatively, the foot massage system 4 can be automatically activated into power-on status. When the foot massage system 4 is rotated down, the registration areas 10 in form of temporal protrusions will be automatically inflated to 30% to 70%, preferably 40%, of their full volume. When the passenger's feet are guided to the proper massage position by the temporal protrusions and the pressure detected by all of the pressure sensors 8 are equal to or larger than the predetermined values of pressure, the massage units 9 are activated automatically.

Optionally, in another embodiment of the invention, the registration areas 10 are permanent protrusions. The passenger can rotate down the foot massage system 4 from the cavity 5, for example by a control device such as a button, and activate the foot massage system 4, for example by the control device such as a button. When the passenger's feet are not positioned on the foot massage system 4 and the pressures detected by each of the pressure sensors 8 are smaller than the predetermined values of pressure, the massage units 9 are not activated for foot massage. Then, after the passenger's feet are positioned on the foot massage system 4 and guided to proper massage position by the permanent protrusions, and when the pressure detected by all of the pressure sensors 8 are equal to or larger than the predetermined value of pressure, the massage units 9 are activated for the foot massage. If the passenger's feet uplift or move, which makes any one of the pressure detected by the pressure sensors 8 smaller than the predetermined values of pressure, the massage units 9 stop to work, so as to remind the passenger to locate feet on proper massage position and save energy.

In addition, in this embodiment, the foot massage system 4 can be automatically activated into power-on status. When the foot massage system 4 is rotated down, and the passenger's feet are guided to the proper massage position by the permanent protrusions and the pressure detected by all of the pressure sensors 8 are equal to or bigger than the predetermined value of pressure, the massage units 9 are activated to work automatically.

Indeed, in these embodiments, the pressure sensors 8 may not be necessary. Under some circumstances, in order to meet the requirement of design and costs, it is possible to arrange the registration areas 10 only without the pressure sensors 8, so as to guide the passenger's feet to proper position and provide massage directly.

In the above embodiments, the massage units 9 of the foot massage system 4 may be chosen from a plurality of pneumatic massage elements in the form of cells, a plurality of massage rollers and a plurality of electromagnetic massage actuators.

It should be noted that, the embodiments mentioned above are used as examples and cannot be construed as limiting the scope of the invention. On the basis of this, a man skilled in the art could expect other embodiments having the same function within the scope of protection of the application.

The invention claimed is:

1. A vehicle seat comprising a seat back having a foot massage system, wherein the seat back includes a front side and a rear side, the rear side receiving the foot massage system, said foot massage system configured to pivot around an axis that is fixed relative to the seat back between a first in-use position, in which the massage system is pivoted down to receive a passenger's feet, and a second foldedaway position, in which the massage system is retracted along the rear side of the seat back,
   wherein the massage system includes a cover,
   wherein, in the first in-use position, the cover opens up to form an open foot receiving space for freely receiving the passenger's feet from multiple horizontal directions,
   wherein the massage system includes a foot registration system which contains registration areas for guiding the passenger's feet to a proper massage position, and
   wherein the registration areas comprise inflatable temporal protrusions including a plurality of pneumatic massage elements which are controlled to be inflated to 30% to 70% of their full volume when the massage system is ready for use, before massaging is activated and before the feet are guided to the proper massage position, and which are controlled to directly contact the passenger's feet for providing the massage, after massaging is activated.

2. The vehicle seat according to claim 1, wherein the plurality of pneumatic elements includes at least three pneumatic elements for each foot, and the temporal protrusions for each foot are formed by one of the pneumatic elements located in a lower center portion of the massage system.

3. The vehicle seat according to claim 1, wherein the registration areas comprise permanent protrusions.

4. The vehicle seat according to claim 3, wherein the permanent protrusions include thin elastic elements.

5. The vehicle seat according to claim 4, wherein the permanent protrusions comprise magnetic elements.

6. The vehicle seat according to claim 1, wherein the registration areas are configured to be positioned opposite to the arch of each passenger's foot for the foot in the proper massage position.

7. The vehicle seat according to claim 1, wherein the massage system further comprises a pressure detection system for sensing the stable position of the feet on the massage system ready for massage.

8. The vehicle seat according to claim 7, wherein the pressure detection system comprises at least three pressure sensors for each foot, and when all of these pressure sensors are pressed by the foot, the foot massage system is ready for the massage.

9. The vehicle seat according to claim 1, wherein the foot massage system includes a plurality of pneumatic massage elements in the form of cells.

10. The vehicle seat according to claim 1, wherein the foot massage system includes a plurality of massage rollers.

11. The vehicle seat according claim 1, wherein the foot massage system includes a plurality of electromagnetic massage actuators.

12. The vehicle seat according to claim 1, wherein the rear side comprises a cavity for receiving the foot massage system, and the massage system is retracted into the cavity when said foot massage system is in the second folded-away position.

13. The vehicle seat according claim 1, wherein the temporal protrusions contact and take the shape of the passenger's feet when guiding the passenger's feet to the proper massage position.

14. The vehicle seat according to claim 1, wherein the inflated temporal protrusions are adapted to guide the feet to the proper massage position.

* * * * *